United States Patent
Hainzl

(10) Patent No.: US 9,519,565 B2
(45) Date of Patent: Dec. 13, 2016

(54) METHOD FOR AUTOMATICALLY MONITORING AT LEAST ONE COMPONENT OF A PHYSICAL SYSTEM

(75) Inventor: Stefan Hainzl, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 785 days.

(21) Appl. No.: 13/992,572

(22) PCT Filed: Nov. 21, 2011

(86) PCT No.: PCT/EP2011/005856
§ 371 (c)(1),
(2), (4) Date: Aug. 14, 2013

(87) PCT Pub. No.: WO2012/079685
PCT Pub. Date: Jun. 21, 2012

(65) Prior Publication Data
US 2013/0332779 A1    Dec. 12, 2013

(30) Foreign Application Priority Data

Dec. 17, 2010    (DE) .......................... 10 2010 054 876

(51) Int. Cl.
*G01D 18/00*    (2006.01)
*G01D 21/00*    (2006.01)
(Continued)

(52) U.S. Cl.
CPC ....... *G06F 11/3466* (2013.01); *G05B 23/0235* (2013.01); *G05B 23/0237* (2013.01);
(Continued)

(58) Field of Classification Search
CPC ..... G05B 23/00; G05B 23/02; G05B 23/0205; G07C 3/00
(Continued)

(56) References Cited

U.S. PATENT DOCUMENTS 4,967,337 A * 10/1990 English ............. G05B 13/0265
700/79
5,305,426 A *  4/1994 Ushioda ................... G21D 3/04
706/52

(Continued)

FOREIGN PATENT DOCUMENTS

DE             19936434        1/2003
DE           102005048015      4/2007
(Continued)

OTHER PUBLICATIONS

English translation of International Search Report and Written Opinion from counterpart PCT App No. PCT/EP2011/005856.
(Continued)

*Primary Examiner* — Manuel L Barbee
*Assistant Examiner* — Jeremy Bishop
(74) *Attorney, Agent, or Firm* — Shuttleworth & Ingersoll, PLC; Timothy Klima

(57) ABSTRACT

A method for automatic monitoring of at least one component of a physical system, includes checking data of a data record for errors caused by a preceding data processing, checking the data in the physical context of the at least one sensor for errors resulting from infringements of assumptions of physical and/or system-related factors in elements of the measurement chain, the context of the component for errors resulting from infringements of the physical and/or system-related factors of the component, and—checking the individually asserted errors against one another and then either rejecting the error or outputting the error as an error message with reference to the error source.

6 Claims, 6 Drawing Sheets

Figure 1:
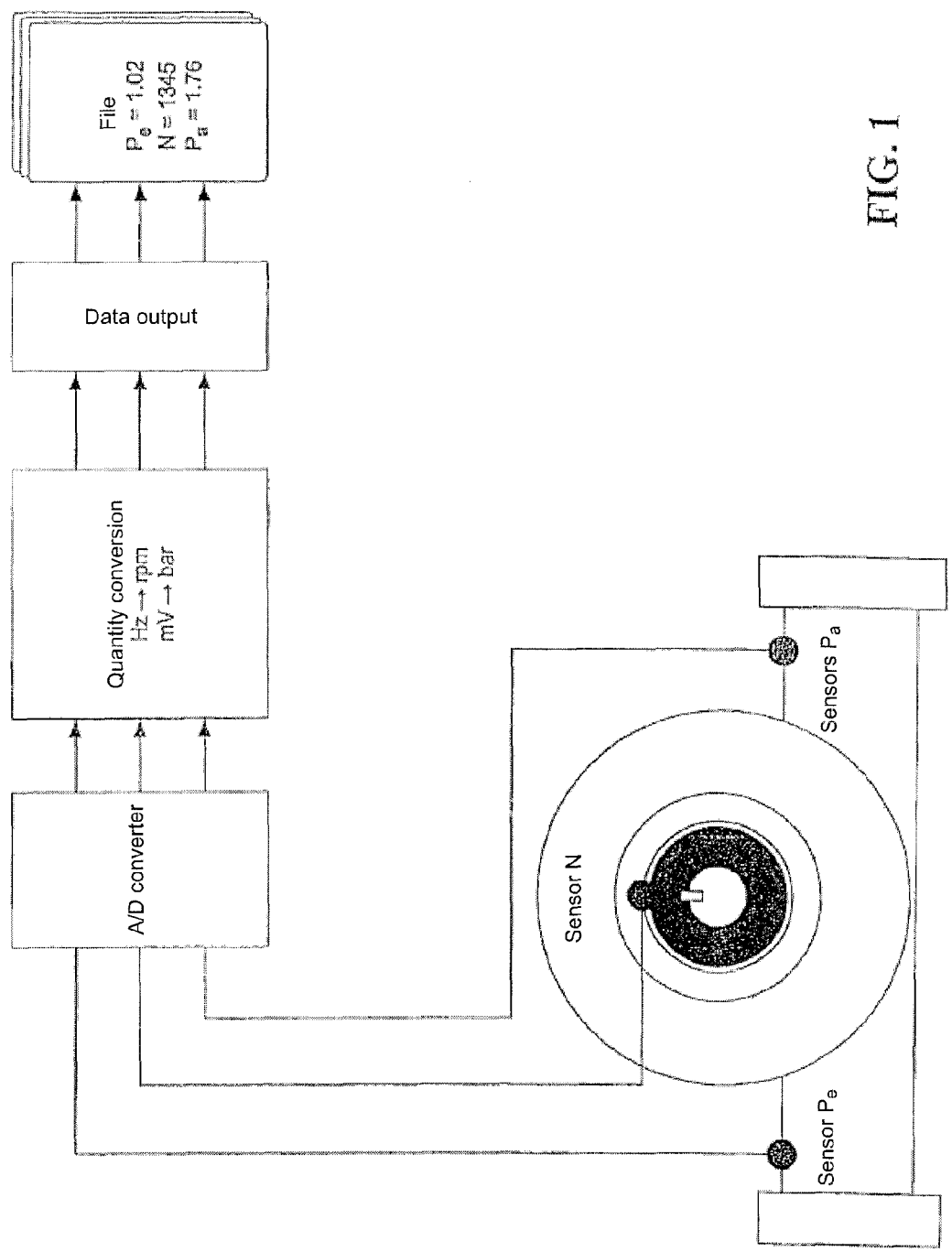

(51) Int. Cl.
  *G01R 35/00* (2006.01)
  *G01P 21/00* (2006.01)
  *G06F 11/34* (2006.01)
  *G07C 3/08* (2006.01)
  *G07C 5/08* (2006.01)
  *G05B 23/02* (2006.01)
  *G01B 5/28* (2006.01)
  *G01R 15/00* (2006.01)
  *G06F 11/30* (2006.01)
  *G21C 17/00* (2006.01)

(52) U.S. Cl.
  CPC ............. *G07C 3/08* (2013.01); *G07C 5/0808* (2013.01); *G07C 5/085* (2013.01)

(58) Field of Classification Search
  USPC ............................... 702/35, 57, 85, 183–185
  See application file for complete search history.

(56) References Cited

U.S. PATENT DOCUMENTS

| | | | | |
|---|---|---|---|---|
| 5,905,989 | A * | 5/1999 | Biggs | G06Q 10/00 |
| 6,446,027 | B1 * | 9/2002 | O'Keeffe | G01R 31/02 |
| | | | | 702/181 |
| 6,480,792 | B1 * | 11/2002 | Prendergast | G07C 3/00 |
| | | | | 702/42 |
| 6,766,230 | B1 | 7/2004 | Rizzoni et al. | |
| 7,333,917 | B2 * | 2/2008 | Greis | G06F 11/008 |
| | | | | 702/183 |
| 7,369,969 | B2 * | 5/2008 | Scherr | H04Q 9/00 |
| | | | | 702/104 |
| 2004/0176887 | A1 * | 9/2004 | Kent | G07C 5/008 |
| | | | | 701/29.5 |
| 2007/0118270 | A1 | 5/2007 | Wiseman et al. | |

FOREIGN PATENT DOCUMENTS

| | | |
|---|---|---|
| DE | 102006031730 | 1/2008 |
| EP | 1455313 | 9/2004 |
| EP | 2063399 | 5/2009 |

OTHER PUBLICATIONS

German Search Report dated Jun. 8, 2011 from counterpart application.
International Search Report dated Dec. 27, 2011 from counterpart application.
Qiao Sun, "Sensor Fusion for Vehicle Health Monitoring and Degradation Detection", Information Fusion, 2002, pp. 1422-1427.

* cited by examiner

METHOD FOR AUTOMATICALLY MONITORING AT LEAST ONE COMPONENT OF A PHYSICAL SYSTEM

This application is the National Phase of International Application PCT/EP2011/005856 filed Nov. 21, 2011 which designated the U.S.

This application claims priority to German Patent Application No. DE102010054876.6 filed Dec. 17, 2010, which application is incorporated by reference herein.

The automatic monitoring methods known from the state of the art consider only those algorithms using which a plurality of signals are processed in an unstructured manner. It is predominantly only statistical methods which are used here to illustrate the correlations between individual components.

A method for monitoring of a vehicle is known from EP 2 063 399 A2. Although the overall system is subdivided into sub-systems here, it is not a causality in the system that is considered on the basis of a subdivision of the physical system, instead there is parallel and algorithm-assisted monitoring for each sub-system.

It has proved to be a disadvantage in the procedures known from the state of the art that an error causality of the overall system is not taken into account.

A further disadvantage of the previously known methods is that they cannot take sufficiently into account the difficulties of real systems, in which for example an error occurs between a physical sensor and the system. Only two states are taken into account here, i.e. complete functioning or complete failure, which in turn leads to erroneous monitoring of the overall system. By contrast, real systems include a plurality of sensors for measuring a parameter of the system, so that the quality of monitoring could be improved by exploiting redundancy.

The object underlying the present invention is to provide a method for automatic monitoring of at least one component of a physical system which permits dependable automatic error assessment in a complex system too.

It is a particular object to provide solution to the above problems by a combination of features described herein. Further advantageous embodiments will become apparent from the present description.

In accordance with the invention, at least one sensor of a component to be monitored emits in this method an electrical signal via a measurement chain, which signal is read and processed and then saved as a file in a data record. Subsequently, the data of the data record is checked (in a first checking step) for errors that might be caused by the preceding data processing. Hence an automatic search takes place for errors which are caused by the data processing of the measurement chain, but not however by the sensor itself, for example.

In a subsequent (second) checking step, and in accordance with the invention, the data of the data record is placed in the physical context of the at least one sensor and checked for errors that might result from infringements of the assumptions of the physical and/or system-related factors in the elements of the measurement chain. There is thus an error search in the physical system within the measurement chain.

In an (optional and interposed) checking step, the sensors classed as equivalent are, if present in the system to be monitored, compared with one another. This provides further indications of sensors reacting incorrectly.

In the following (in a third checking step) the data of the data record is placed in the context of the component itself and checked for errors that might result from infringements of the physical and/or system-related factors of the component. After a search in the first checking step for data processing errors and in the second checking step for errors in the elements of the measurement chain, a search for errors of the component itself therefore takes place in the third checking step.

In accordance with the invention, a subdivision of the overall system is therefore made which considers all physical units and their relationships to one another. The present invention can thus be applied to any complex physical system.

Following the object-based check, the individually asserted (detected) errors are in accordance with the invention checked against one another in a feedback section. The errors (error messages) are, as a consequence of the check, either rejected or displayed to a human operator of the physical system as an error message with reference to the error source.

In accordance with the invention, an overall architecture of the monitoring system is therefore based on the fact that every error has causes and effects. These effects do not necessarily show themselves at the same place as the cause, but can give rise to symptoms in remote and dependent sub-systems. These symptoms can result in additional errors and thus make isolation of the error more difficult. The feedback described above is therefore regarded as an integral part of the monitoring system and of the monitoring method.

In accordance with the invention, erroneous units, or data in general within the causal system, are therefore searched for. Dependent and following units thus receive in accordance with the invention only trustworthy information and can take into account the state of upstream units in their own monitoring system, so that the disadvantages resulting from the monitoring systems known from the state of the art are prevented or mitigated in accordance with the invention.

Furthermore, the method in accordance with the invention acts as an accelerator for error detection and isolation algorithms, since the major problem involved in monitoring a complex system is subdivided into smaller partial problems.

Figure 3:
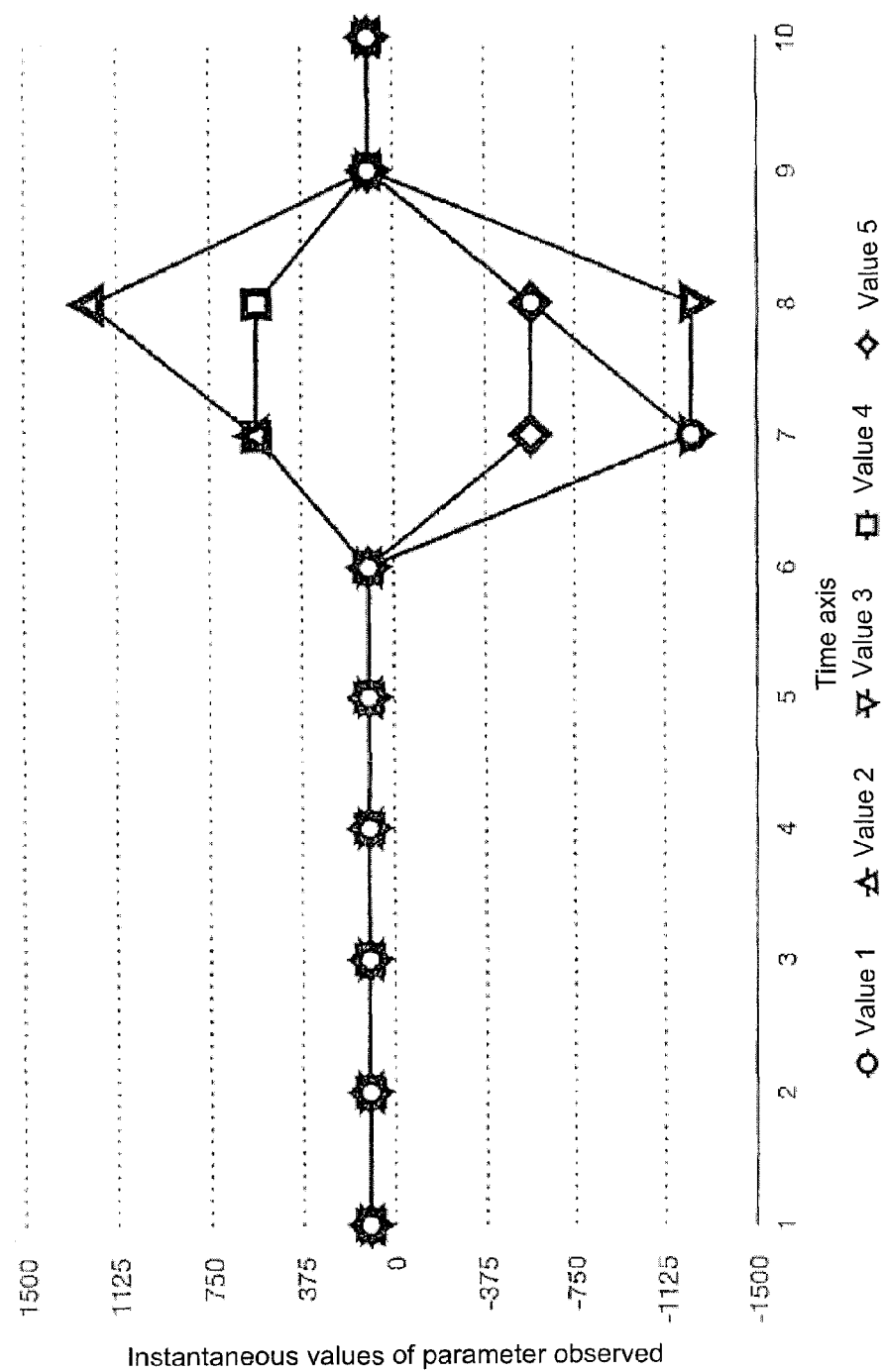
Figure 4:
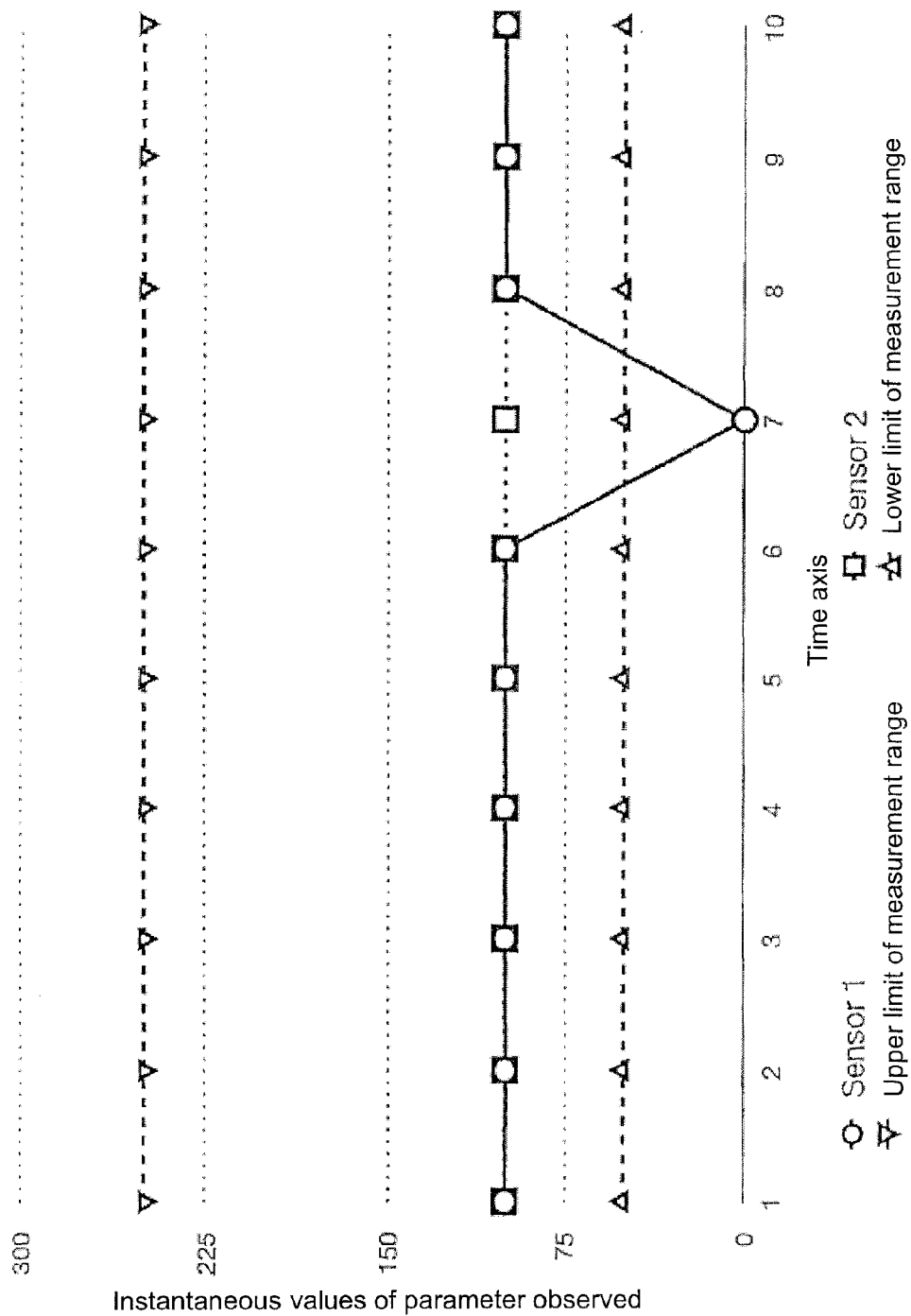
Figure 5:
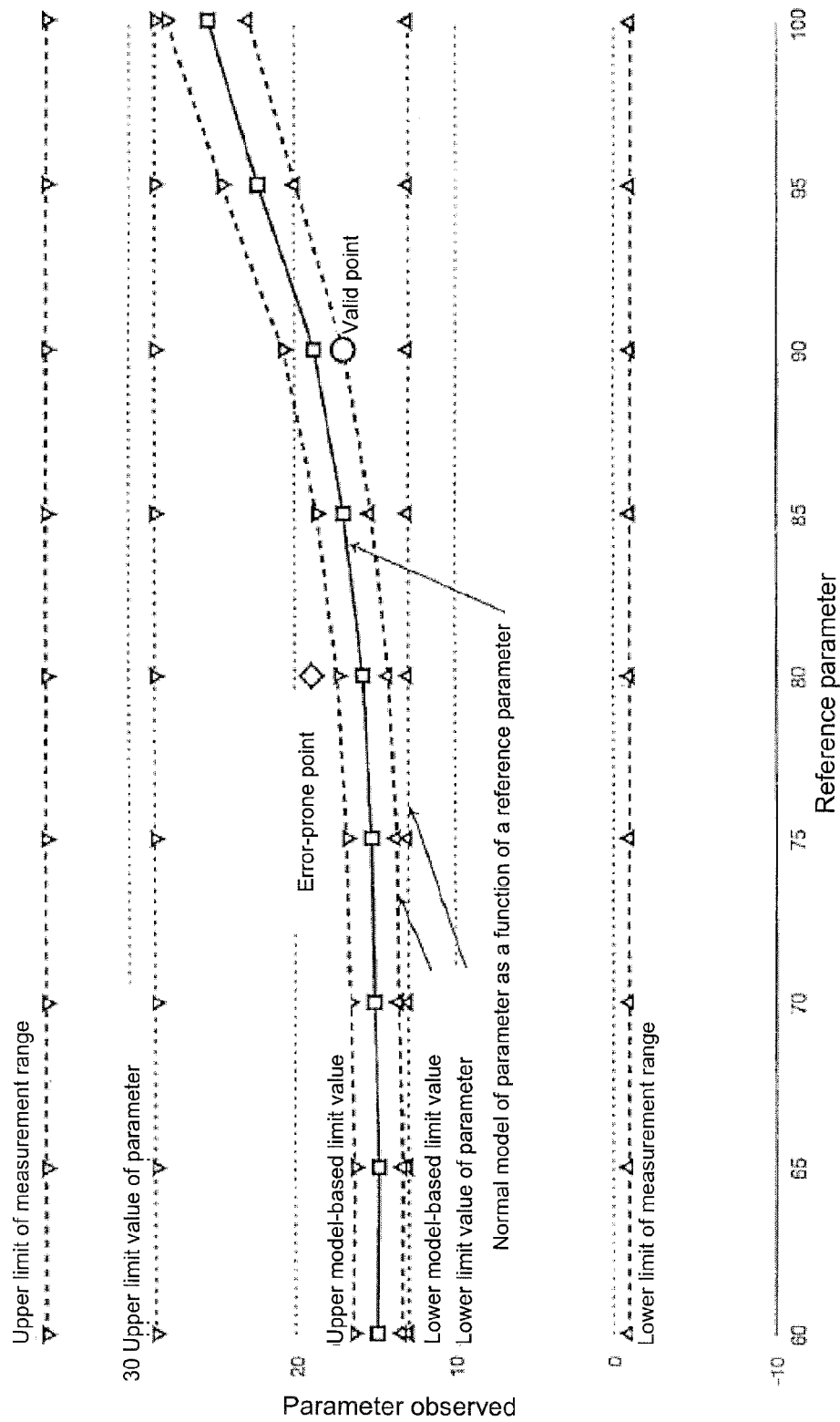
Figure 6:
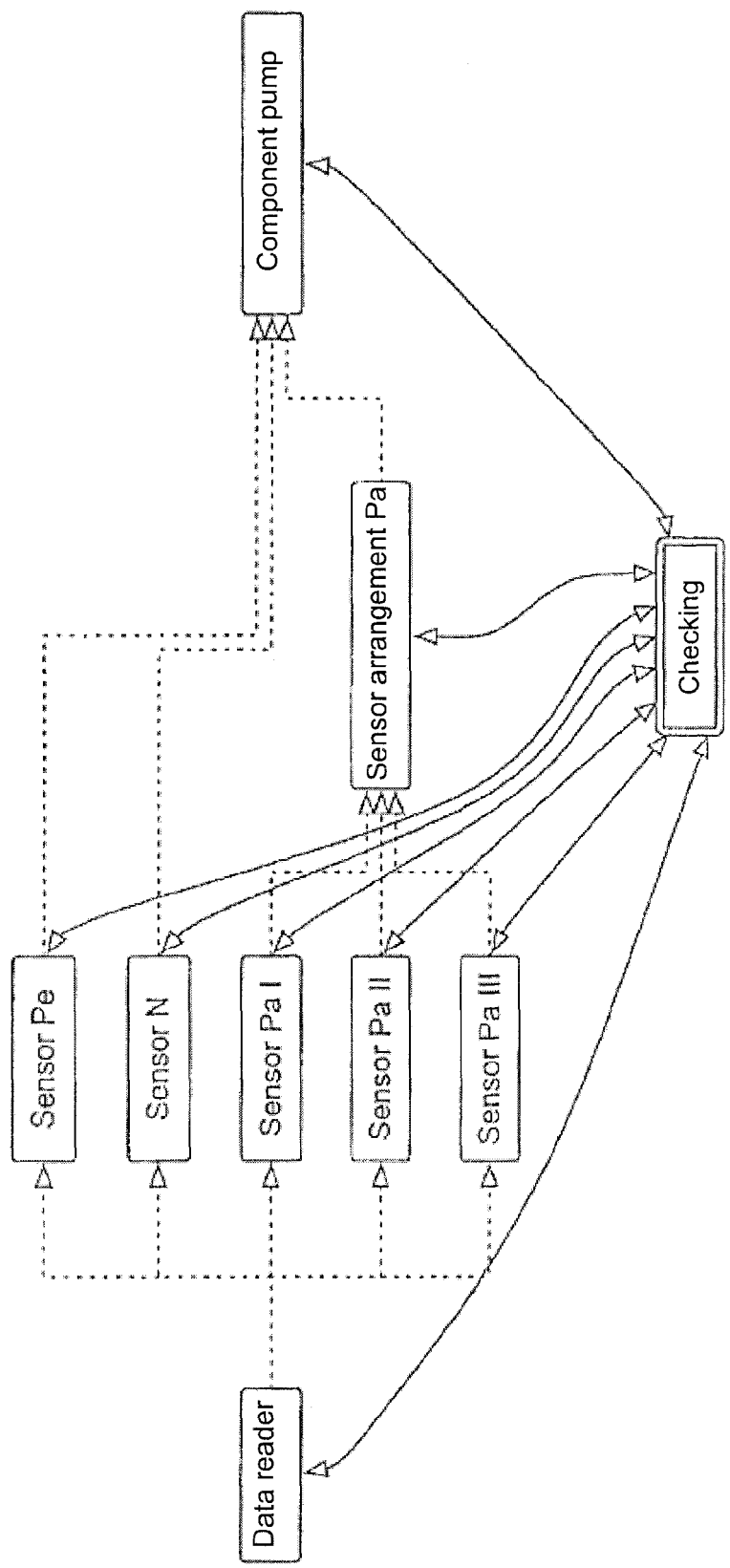

The present invention is described in the following in light of the accompanying drawing showing an exemplary embodiment. In the drawing, FIG. 1 shows a schematic representation of the configuration of a physical system to be monitored, FIG. 2 shows a representation of the configuration of the model of the arrangement as per FIG. 1, FIG. 3 shows an example of an error in the data output system, FIG. 4 shows a representation of an interruption in a measurement, FIG. 5 shows a comparative representation of a model-based error detection, and FIG. 6 shows a schematic representation of the objects and the associated checking.

FIG. 1 shows in a schematic and simplified representation a physical system based on a pump. This includes for example a sensor N for the speed, a sensor Pe for the inlet pressure and several sensors Pa for the outlet pressure. The signals of the sensors are converted using an analog/digital converter. This is followed by a quantity conversion, for example in order to convert vibration signals of the sensor N into a speed value, or to convert voltage values of the sensors Pe and Pa into pressure values. This in turn is followed by a data output and saving of the respective data in a file.

In the configuration shown in FIG. 1, the sensor Pa represents a sensor arrangement with three sensors that are equivalent to one another.

Figure 2:
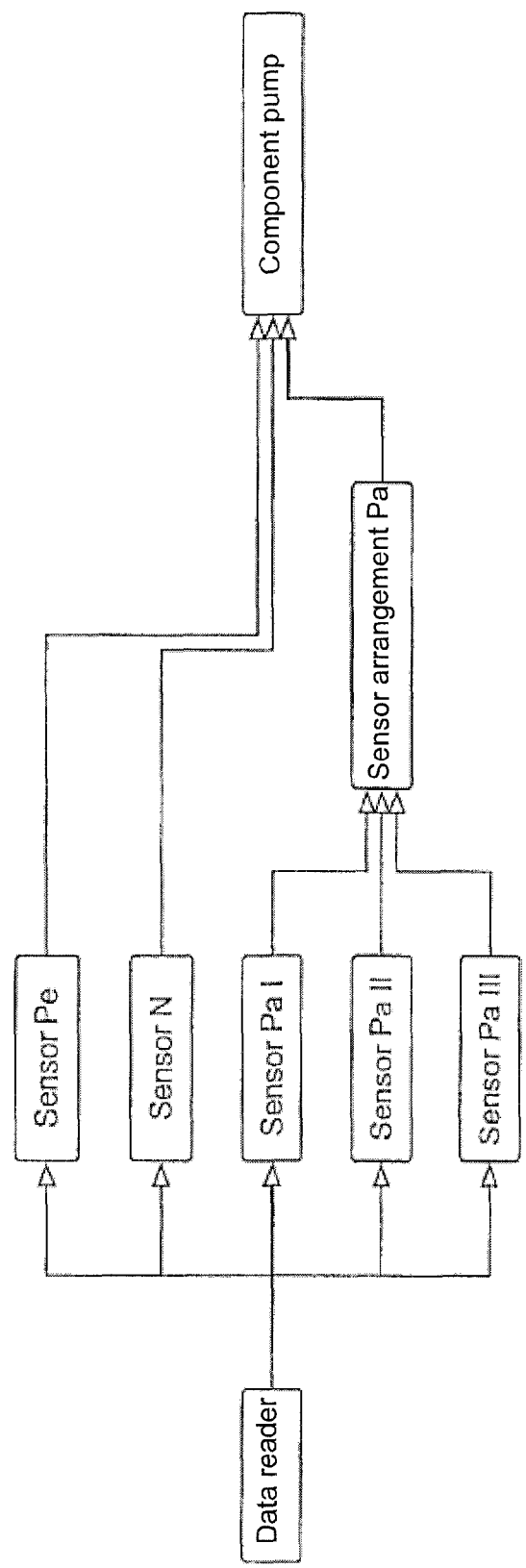

The following represents the model configuration on the basis of FIG. 2:

The monitoring system in accordance with the invention, which represents an illustration of the physical system, consists of the following elements:
- a data reader which receives the data from the emitting system;
- sensors, i.e. a sensor Pe, a sensor N and three sensors Pa;
- a sensor arrangement using the three sensors Pa as an input;
- a component reflecting the pump.

Each of the objects is provided with algorithms, which on the one hand make available values derived from the input values and on the other hand check the validity of the input values.

In the following an error detection by the data reader is represented on the basis of FIG. 3.

In the data reader (see FIG. 2), the values were not yet assigned any context. These are therefore only values as such, which however have in common their processing by the physical data output system.

FIG. 3 shows a possible case of error in which the data output system for a moment writes meaningless values into the file. This can be due to various causes, for example a transmission error between a test rig and a hard drive connected via a network. This error can be detected by the abrupt change of all input values, for example. FIG. 3 shows that in a comparison with the preceding input values, it is striking that for a certain period widely different values occur, while subsequently the preceding identical values are present again (the abscissa shows the time axis). Further errors can be erroneous time scales or wide discontinuities.

The relevance of detecting this type of error lies in its further use. A following sensor object could adopt these values and from them supply incorrect values for the monitoring algorithms of the then following component.

Interruptions in measurement in connection with the sensors are explained on the basis of FIG. 4.

Sensors are physical objects whose context is assigned to the model sensors. The context exists in this case in the measurement range, for example.

Accordingly, this information can already be used for error detection at the level of the sensor.

In respect of the illustration in FIG. 4, the importance of the preceding validation becomes evident in turn. If it was already detected in the data reader object that the values are meaningless, by definition no error can be detected at the sensor. A classification as "erroneous" for wrong reasons is thus not possible.

A further example for an actual error of the sensor would be unstable electrical connections, due to which interruptions result. A process of this type is shown by way of example in FIG. 4. The assumption that there is no error in the data output applies of course here too (see symbolically sensor 2). Such errors can be detected for example by very steep and physically unexplainable flanks.

In the following the sensor arrangement is explained in detail:

If there is redundancy at a physical position (as in the example Pa with respect to three equivalent sensors provided parallel to one another), this can be used for error detection. For example, one of the sensors from the measurement group might supply measured values with incorrect prefixes, without leaving its measurement range to do so. Whether this error is due to an incorrect physical connection of the sensor (incorrect polarity), to the A/D conversion or to a quantity conversion can only be ascertained with difficulty. The crucial point is however to pinpoint the problem as such.

The following deals with the component in conjunction with FIG. 5. While sensors are still relatively simple systems, the "component" objects are intended to illustrate complex systems or system groups.

Error detection can be very simple here, for example extreme values of a parameter can be fixed in the normal state and defined as error threshold values. These are shown in FIG. 5 as the "upper and lower limit values of the parameter". These threshold values or limit values usually have to be completely within the measurement range of the recording sensors, permitting simple assignment.

This broad approach can be narrowed by a model-based limitation of the normal values for the respective operating state. These models can also be designed to be adaptive, which would appear to be particularly sensible for long-operating systems subject to wear.

At this point, the advantages of sequential error detection existing in accordance with the invention become particularly clear. In the course of adaptation, erroneous input values would distort the adapted model.

A further example for the approach in accordance with the invention is detection by signatures. A broken-off vane in the pump can, depending on the speed regulation, lead to an increase in the speed with a simultaneous reduction of the pressure Pa. This change can still take place within the model tolerances set forth above if the latter have been selected relatively wide for reasons of robustness.

Sequential error detection in accordance with the invention can in turn corroborate the result here. If the sensor arrangement Pa were to detect that only one of the sensors is reacting, it would class its status as erroneous. That would only leave the speed increase, which however might be for deliberate reasons. The decision on this is then the job of the final stage of automatic monitoring (checking, see next section) in accordance with the invention, but initially an error detection would be averted. Further examples for errors to be detected here are parameter drifts or measurement range distortions.

In the following, the feedback is described on the basis of FIG. 6.

In the automatic monitoring sequence described above, the evaluation of the physically present elements of the monitored system ends in principle. An important aspect here in accordance with the invention is the continuing improvement in the validation of the data away from the data output towards the component, which is enabled by the sequential method of error detection. Hence search algorithms of the subsequent object are based on already validated data. The outcome of this is more trustworthy results.

Despite this, it is necessary with regard to the automatic monitoring method in accordance with the invention to re-evaluate all detected errors.

If for example there was, within the "component pump" object, monitoring of the frequency pattern in the pressure measurement, this monitoring would ascertain the change in the form of an additional reaction for the frequency of the pump at precisely that sensor actually identified as non-valid by the comparison within the sensor arrangement.

The feedback section, represented by the object "checking" (see FIG. 6), is designed to make the decision on whether a subordinate object must be completely distrusted and thus excluded from all considerations. Accordingly, there is conversely the possibility to take changes into account, for example the frequency pattern change for the pump frequency as discussed above, and hence to detect the true error.

The feedback section thus forms the central factor for the entire monitoring. All information is collated here and checked on the basis of a suitable set of algorithms. These algorithms take the information and data into account and prioritize them with one another. It is for example possible for an error message to be ignored when "checking" ascertains that this error is only the result of another error.

As can be concluded from the above explanations, a dual connection of the algorithms is thus provided in accordance with the invention, i.e. firstly in the sequence of objects and secondly by the overriding "checking". The result in accordance with the invention is furthermore the possibility to use simpler and clearer algorithms. As a result, on the one hand less computing capacity is needed, and on the other hand the proneness of the algorithms themselves to errors is reduced.

In accordance with the invention, there is thus a transition from the physical system to be monitored to the pure monitoring system, and subsequently reference back to the physical system within the monitoring system.

It must furthermore be pointed out that the user of the method for automatic monitoring in accordance with the invention is not necessarily the person that operates or directly uses the system to be monitored. The method for automatic monitoring can instead be used for complex systems at a suitable location.

There is furthermore the possibility in accordance with the invention that the user or human operator of the physical system interactively cooperates with the computer program implementing the method, for example to change the structures, to react to automatic messages and to extract data generated by the algorithms for a manual analysis. A basic computer program can furthermore offer the possibility of automatically saving the ascertained data for later evaluation and/or use.

Furthermore, there is the possibility of saving the results during "checking" while taking into account and evaluating the error messages that have occurred. By doing so, error frequencies and their elimination can be automatically taken into account when errors of this type occur repeatedly.

What is claimed is:

1. A method for automatic monitoring of at least one component of a physical system,
   where at least one sensor automatically monitors a characteristic of a component of a physical system and emits an electrical signal corresponding to a value of the characteristic via a measurement chain connected to a data reader of a computer system, which electrical signal is read by the data reader at a computer system, processed by the computer system and then output by the computer system to be saved as a data file in a data record of the computer system,
   where subsequently in a first checking step the computer system checks the data file of the data record for first errors caused by the preceding processing by the computer system,
   where subsequently in a second checking step the computer system checks the data file of the data record for second errors that result from problems with the at least one sensor and the measurement chain,
   where subsequently in a third checking step the computer system checks the data file of the data record for third errors that result from problems with the component, and
   where subsequently in a fourth checking step the first, second and third errors are checked against one another and known data for possible errors to isolate an error source and are either rejected if the isolated error source is not deemed sensible in light of the first, second and third errors or known data or output as an error message with reference to the isolated error source;
   wherein the computer system automatically takes corrective action to correct the isolated error source.

2. The method in accordance with claim 1, where after the second checking step in a further checking step, where the at least one sensor includes a plurality of equivalent sensors each measuring the characteristic of the component of the physical system, the data file of the data record is checked for comparative errors between the plurality of equivalent sensors, which comparative errors result from problems with at least one of the plurality of equivalent sensors.

3. The method in accordance with claim 1, wherein data corresponding to the first, second and third errors is automatically stored in the data record.

4. The method in accordance with claim 1, wherein the output of the error message includes at least one automatic generation of a proposal for error detection.

5. The method in accordance with claim 1, wherein the physical system is a pump system and the component is a pump of the pump system, and the at least one sensor includes at least one chosen from a rotational speed sensor sensing a rotational speed of the pump, an inlet pressure sensor sensing an inlet pressure of the pump, and an outlet pressure sensor sensing an outlet pressure of the pump.

6. The method in accordance with claim 5, wherein the at least one sensor includes each of a rotational speed sensor sensing a rotational speed of the pump, an inlet pressure sensor sensing an inlet pressure of the pump, and an outlet pressure sensor sensing an outlet pressure of the pump.

* * * * *